Dec. 28, 1948.  E. J. MARTIN ET AL  2,457,700
TORQUE METER
Filed Dec. 9, 1942  2 Sheets-Sheet 2

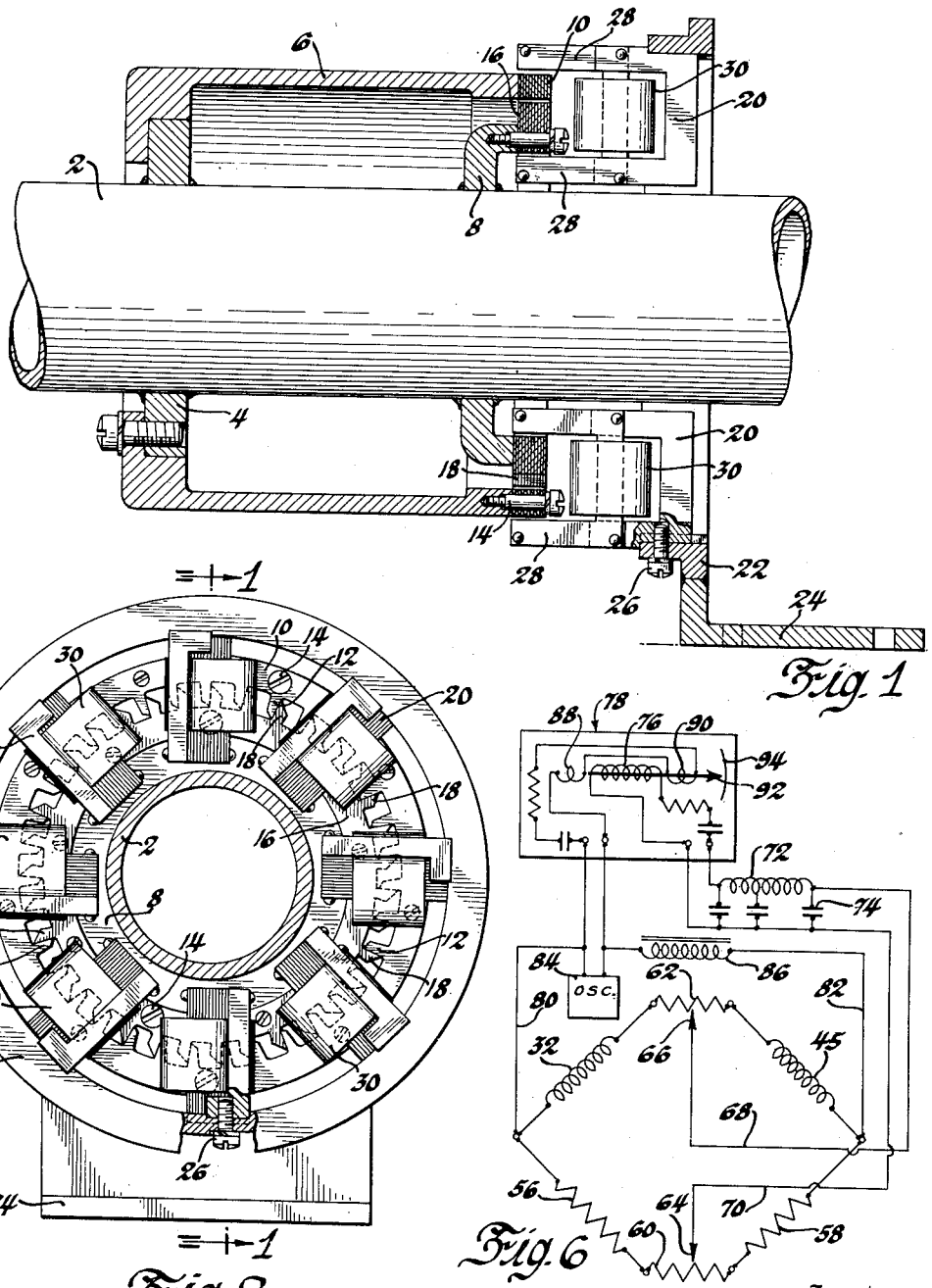

Inventors
Edward J. Martin &
Walter E. Sargeant.
By Blackburn, Spencer & Hunt
Attorneys Patented Dec. 28, 1948

2,457,700

UNITED STATES PATENT OFFICE 2,457,700

TORQUE METER

Edward J. Martin, Pleasant Ridge, and Walter E. Sargeant, Ferndale, Mich., assignors to General Motors Corporation, Detroit, Mich., a corporation of Delaware Application December 9, 1942, Serial No. 468,374

12 Claims. (Cl. 73—136)

This invention relates to indicating means and more specifically to means for indicating torque upon a rotating shaft.

It is often desirable and frequently necessary to be able to ascertain the amount of torque or load upon a rotating shaft in operation. One specific example of such instance might be in airplane engine operation where in order to operate the plane most economically and effect long-range operation on a minimum of fuel some means must be provided to measure the torque load on each engine so that it may be set for maximum efficiency. There are of course a large number of other instances in which it is necessary to be able to read the torque load on a rotating shaft.

It is therefore an object of our invention to provide means to indicate the torque on a rotating body.

It is a further object of our invention to provide a mechanism which will give an indication of torque which directly cooperates with the shaft.

It is a still further object of our invention to provide torque measuring means which can be applied to a shaft without modifying the shaft construction.

With these and other objects in view which will become apparent as the specification proceeds, the embodiments of our invention will be best understood by reference to the following specification and claims, and the illustrations in the accompanying drawings, in which:

Figure 1 is a vertical sectional view of our torque pick-up means mounted on a shaft taken on line 1—1 of Figure 2;

Figure 2 is an end elevation of the pick-up means;

Figure 6 is a circuit diagram showing the connection of the pick-up means into an indicating circuit.

Figure 3:
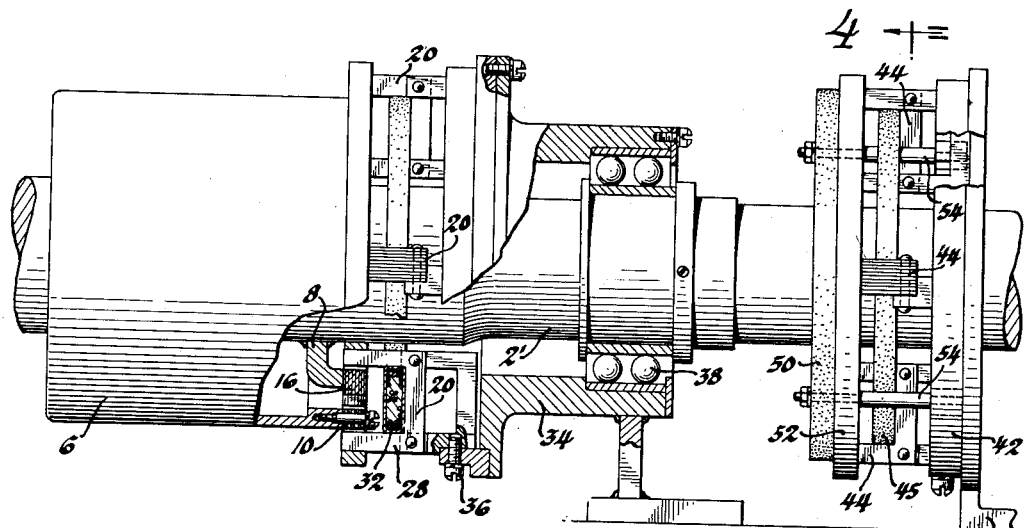
Figure 3 is a side elevation of a modified form of our invention with parts being broken away and shown in section.

It is of course well-known that by applying a load to a rotatable shaft there is a certain amount of twist or wind-up therein, dependent upon the relation of the load to the size of the shaft, and that this wind-up or twist is substantially equal along increments of the length of the shaft and is proportional to the load. Thus, if means can be supported at axially spaced positions on the shaft and then brought into juxtaposition, there will be a slight relative motion between the two parts upon application of the load due to the wind-up in that portion of the shaft between the two supporting points. This slight relative motion may be used to vary desired electrical characteristics and give an indication of the torque or load applied; for example, this relative movement may be utilized to change or vary a path of magnetic flux and in doing so change the inductance of a circuit, which change can be measured and an indication of torque obtained. It may of course also be used to vary other characteristics which may be measured and it is desired to point out that the flux change shown herein is only exemplary and our invention should not be limited thereto but considered in its broader scope.

Referring now more specifically to the drawings, there is shown in Figure 1 a rotatable shaft 2 which is secured to a load (not shown) and whose torque it is desired to measure. Fixedly secured thereto at one point is a collar 4 which supports one end of a cylindrical drum 6 of larger diameter than the shaft and which extends axially thereof from its base secured to the collar.

In the open space between the drum end and the shaft is fixedly supported to the shaft 2 an angle collar 8 which extends toward the drum for a short distance and then turns parallel thereto. These two juxtaposed surfaces, that is, the end of the angle collar and the end of the drum, support the means which is relatively moved small distances to provide a change in the flux path by the wind-up in the shaft between the two collars 4 and 8.

To the radial face of the end of the cylindrical drum is secured an annular ring 10 formed of laminations of iron and having a series of teeth 12 projecting inward of the circle so formed. This ring is secured to the end of the drum by suitable machine screws 14 which are spaced at intervals around the periphery. To the radial face of the inner angular collar 8 is secured a similar laminated ring 16 which in like manner has a series of projecting teeth 18 on its outer periphery, the two sets of teeth projecting towards each other and entering the interstices between adjacent teeth on the opposite ring. This forms two complete sets of interlocking teeth. The distance however between the adjacent teeth on any one ring is considerably more than the width of the tooth which projects into this space from the other ring. This construction is clearly shown in Figure 5 which is the enlarged detail of this particular part. The rings are so mounted that in the position of rest the teeth 18 of the inner ring lie substantially in contact with the teeth 12 of the outer ring. Upon the application of torque to the shaft 2 the wind-up in the shaft tends to cause relative movement between the two sets of teeth in such a direction as to cause the teeth 18 to move away from the teeth 12 which will of course introduce an air space between the two sets of teeth which will become larger (to a certain point) as the relative motion increases or the wind-up becomes greater.

Figure 5:
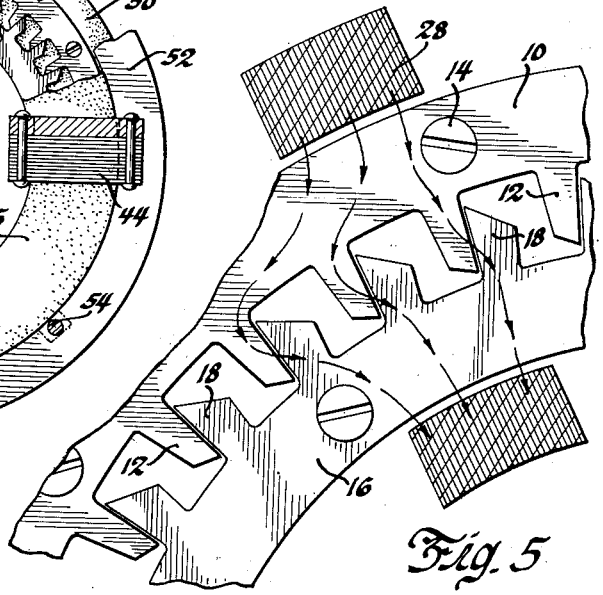
Figure 5 is an enlarged diagrammatic detail view showing the flux paths through the rings.

Spaced circumferentially around the periphery of the shaft are a series of substantially rectangular magnetic core assemblies 20. As shown in Figure 2, there are eight of these, but the number is not important as long as there are a plurality sufficient to give enough current for a desired indication. These core members are supported around a supporting ring 22 which is mounted on any fixed base 24. The core members are secured by any suitable means such as machine screws 26, each core member being provided with a pair of spaced legs 28 which project over the two laminated iron rings 10 and 16 so that the rings rotate between them and mounted between the legs 28 are a series of induction coils 30. Thus the electrical current flowing through each of the coils 30 will induce a magnetic field flowing through the core portion which in any one instance is completed by the magnetic path through the two rings 10 and 16. As shown in Figure 5, the flux path will roughly follow the direction of the arrows.

As soon however as the teeth 12 and 18 are separated by relative movement, the reluctance of the flux path is increased to a considerable extent by the introduction of an air gap which will immediately alter the characteristics of the induction coil and this change may be noted in an indicating circuit to be later described. Each of the coils 30 is of course connected in series so that their resultant effect is additive. Thus the magnetic field of each coil is varied proportionately to the relative motion between the two sets of teeth which in turn is proportional to the wind-up or twist in the drive shaft, and since this change may be measured, gives a direct reading of the torque load on the shaft. It will be noted that the only rotating parts of the apparatus are the two collars and the drum which are secured to the shaft. The magnetic cores, with the exception of the two rings which only form a portion of the complete magnetic circuit, are stationary and furthermore it is therefore not necessary to use any commutator or slip rings to transfer current from a rotating to a stationary part. The air gaps in each of the magnetic circuits are relatively small and as long as the shaft is rotating without a load, the magnetic circuit of each core is substantially unaltered by the rotation of the two laminated iron rings between the projecting leg portions 28.

Figure 4:
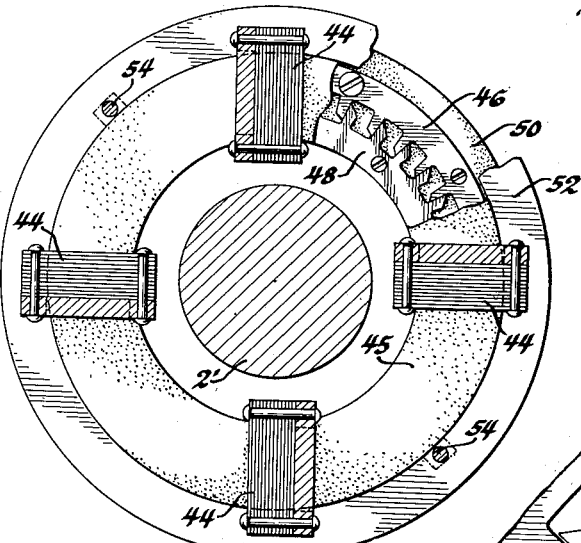
Figure 4 is a sectional view taken on line 4—4 of Figure 3.

In Figures 3 and 4, the modified form indicated therein shows as its main difference the use of only a single coil 32 which is wound as a toroid and fits into a space between the projecting ends 28 of a series of circumferentially spaced core members 20. These core members as before are rigidly secured in spaced circumferential positions by connection to a frame member 34 through machine screws 36. The rotating portion of the apparatus is exactly as that formerly described in Figures 1 and 2 and consists of a cylindrical, axially extending drum 6 which carries one set of laminated iron teeth on ring 10 and an inner angular collar 8 which carries the other set of laminated teeth or ring 16 so in this case as the laminated toothed assembly rotates, the variation in the magnetic path between the two legs 28 of each core will be varied by relative tooth movement. The resultant change however in this case will be applied by each core to the single toroidal coil 32. This simplifies the construction considerably. The base member 34 also carries a roller bearing assembly 38 which assists in maintaining proper relation between the shaft 2' and the torque responsive apparatus.

There are of course in the vicinity of most machinery, and particularly where the torque meter is to be used in proximity to electrical equipment, a large number of what is known as stray fields, that is, electromagnetic flux fields which are generated perhaps by motors or generators, but which vary in intensity, the passage of which through the laminated toothed rings might give false indications and varying currents which were not due to any variation in torque on the shaft. In order to eliminate the effects of these stray fields we have provided a duplicate set of apparatus mounted on the shaft adjacent the measuring equipment which when connected into the opposite arm of a measuring bridge will counteract any effects of such stray fields and enable the operator to obtain a true reading. In this instance however we do not desire any relative motion between the teeth since we wish only to have the two sets of teeth under the same ambient magnetic conditions and therefore do not need to secure any part of this dummy or balancing equipment to the shaft.

Therefore, as shown in the right hand portion of Figure 3, there is mounted on a suitable stationary support 40 a supporting ring 42 which holds a series of core members 44 in axial position so that the spaced legs of each core project around a pair of laminated ring assemblies 46 and 48 which are duplicates of the relatively movable ring assemblies formerly described, but in this case are rigidly secured to an electrically insulating plate 50 which is supported on a circular member 52 carried by spacing bolts 54 from the supporting ring 42. A circular induction coil 45 is mounted within the core members 44 similar to coil 32. Thus this assembly is subjected to the same magnetic fields as the relatively movable one inasmuch as it is mounted closely thereto and any stray fields which affect one will affect the other in the same relation. It may not always be necessary to use a dummy assembly in order to eliminate stray fields as there may be many instances in which the magnetic flux in the vicinity is not large enough to consider but for accurate measurements we have found that it is necessary to provide such a system.

Referring now more specifically to Figure 6 which is the circuit diagram, there is shown therein a bridge circuit in one arm of which is located the pick-up coil element such as 32 and in the opposite bridge arm is located the dummy coil element 45. If no dummy coil assembly is used to overcome the effect of stray fields, this element 45 may be replaced by a balancing inductance coil in the measuring bridge having a value approximately that of the pick-up inductance 32 so that the bridge may be balanced. The two lower arms of the bridge comprise resistances 56 and 58. In each end of the bridge is also an adjusting resistance 60 and 62. These two latter resistances cooperate with movable contact elements 64 and 66, respectively. These contact elements are connected through lines 68 and 70 to a low pass filter consisting of an inductance coil 72 and a plurality of condensers 74 the output of which is connected across an operating coil 76 of an indicating alternating current meter indicated generally at 78.

To the other two terminals of the bridge are applied an oscillating current through lines 80 and 82, said current being generated by an oscillator 84. A filter choke coil 86 is provided in line 82. The oscillator and input circuit is also connected to two terminals on the indicating meter which two terminals are connected to a pair of spaced operating coils 88 and 90 of the meter. The indicating arm 92 of the meter cooperates with a scale 94 to give the necessary indication.

Therefore in operation this device is mounted upon the shaft whose torque is to be measured and the shaft brought up to speed with no load. The indicating circuit is then balanced by varying the positions of the contact members 64 and 66 until the indicating needle 92 reads zero on the index 94. At this time a fluctuating current is being provided to either the series of coils 30 or to the single coil 32 to create a magnetic field through the circumferentially spaced core members 28 and the laminated tooth assemblies 10 and 16. Upon an application of torque to the shaft, the teeth 18 tend to move away from the teeth 12, thus introducing an air gap into the magnetic circuit of each of the core systems and therefore increasing the reluctance of the magnetic circuit which alters the inductance of the coil. This unbalances the bridge and will give an indication on the meter. If, however, there are stray magnetic fields present which vary in intensity, the coil 32 may give an indication to the meter from the stray fields having nothing whatever to do with the torque applied. Therefore if we place an assembly of parts which is an exact duplicate of that used to indicate the torque in immediate proximity to the usable assembly, the effects will be substantially duplicated and if the stray field affects coil 32 it will also affect coil 45 in the same manner and this will prevent an unbalance of the bridge and in that way the effects of the adjacent stray fields will be canceled and any effect or movement of the alternating current meter 78 will indicate a true change in torque on the shaft. As before stated, if the stray fields are not present to any degree, this dummy assembly may be dispensed with and a coil having substantially the inductance of the pick-up coils 30 or 32 may be used in the bridge for measuring purposes.

We claim:

1. In measuring means applicable to a body subject to changes in stress, a plurality of members having good magnetic conductivity and projecting interjacent portions supported on the body at spaced points and solenoid means comprising coil and core means, said core being in juxtaposition to the members whereby they form part of a magnetic circuit and variations in their position will vary the inductance of the coil to give an indication of the stress of the body, duplicate magnetic members mounted in stationary relation adjacent the body and the first magnetic members, duplicate solenoid and core means mounted in juxtaposition to the duplicate magnetic members and indicating means connected to both solenoid means whereby the duplicate solenoid means will balance out the effects of stray magnetic fields.

2. In measuring means associated with a rotating shaft, a pair of members of good magnetic conducting material having projecting interjacent portions fixedly supported on the shaft at axially spaced points, solenoid means having core means extending to opposite sides of the pair of members whereby they form a part of a magnetic circuit and relative movement of the two members will vary the magnetic circuit and thus the inductance of the solenoid, duplicate magnetic members stationarily mounted around the shaft adjacent the first magnetic members, duplicate solenoid means mounted adjacent the duplicate magnetic members and indicating means connected to both solenoid means whereby the duplicate solenoid means will balance out the effects of stray magnetic fields.

3. In measuring means associated with a rotating shaft, a supporting member secured to the shaft, a second supporting member secured at an axially spaced point to the shaft and having a portion extending into juxtaposition with the first member, a ring of iron laminations having projecting teeth secured to each of the supporting members, said teeth mating to form interlocking portions and solenoid means having a core stationarily mounted adjacent the rings on opposite sides thereof whereby the rings form part of a magnetic circuit and relative motion between the rings and their associated teeth will change the magnetic reluctance of the circuit and therefore the inductance of the solenoid means.

4. In measuring means associated with a rotating shaft, a collar secured to the shaft, an axially extending drum secured to the shaft and extending into proximity with the collar, a ring formed of good magnetic properties secured to the drum, inwardly projecting teeth on the ring, a second ring of the same material having external teeth supported on the collar, said two sets of teeth being in interlocking relation and solenoid means mounted adjacent the rings having a core portion extending around the same whereby the rings form a part of a magnetic circuit and alter the reluctance characteristics of the circuit.

5. In measuring means associated with a rotating shaft, a collar secured to the shaft, an axially extending drum secured to the shaft and extending into proximity with the collar, a ring formed of good magnetic properties secured to the drum, inwardly projecting teeth on the ring, a second ring of the same material having external teeth supported on the collar, said two sets of teeth being in interlocking relation, solenoid means mounted adjacent the rings having a core portion extending around the same forming an assembly whereby the rings form a part of a magnetic circuit and alter the reluctance characteristics of the circuit, and a duplicate pair of rings stationarily mounted around the shaft adjacent the first assembly, duplicate solenoid means mounted adjacent the duplicate rings and indicating means connected to both solenoid means whereby the duplicate solenoid means will act to balance out the effects of stray fields.

6. In measuring means associated with a rotating shaft, an axially extending drum secured to the shaft at one end, a collar secured to the shaft adjacent the free end of the drum, a toothed magnetic conducting ring mounted on the drum, a second toothed magnetic ring mounted on the collar and having its teeth mating with the teeth on the first named ring, a plurality of stationary U-shaped magnetic core members whose legs straddle the rings which therefore rotate through them, said rings and core members forming a plurality of magnetic paths, and inductance means associated with the core members affected by any change in the magnetic circuits whereby relative motion between the two toothed rings due to shaft torque will change the magnetic reluctance and change the inductance for indication.

7. In measuring means associated with a rotating shaft, an axially extending drum secured to the shaft at one end, a collar secured to the shaft adjacent the free end of the drum, a toothed magnetic conducting ring mounted on the drum, a second toothed magnetic ring mounted on the collar and having its teeth mating with the teeth on the first named ring, a plurality of stationary U-shaped magnetic core members whose legs straddle the rings which therefore rotate through them, said rings and core members forming a plurality of magnetic paths, inductance means associated with the core members affected by any change in the magnetic circuits whereby relative motion between the two toothed rings due to shaft torque will change the magnetic reluctance and change the inductance for indication, a bridge circuit connected to the inductance means and indicating means connected to the bridge.

8. In measuring means associated with a rotating shaft, an axially extending drum secured to the shaft at one end, a collar secured to the shaft adjacent the free end of the drum, a toothed magnetic conducting ring mounted on the drum, a second toothed magnetic ring mounted on the collar and having its teeth mating with the teeth on the first-named ring, a plurality of stationary U-shaped magnetic core members whose legs straddle the rings which therefore rotate through them located at spaced circumferential points, said rings and core members forming a plurality of magnetic paths, a coil mounted on each core, and means for serially connecting said coils whereby any relative motion between the rings and teeth due to shaft load will vary the reluctance of the magnetic path between the legs of each core and change the inductance of the coil and the multiple result in series may be measured.

9. In measuring means associated with a rotating shaft, an axially extending drum secured to the shaft at one end, a collar secured to the shaft adjacent the free end of the drum, a toothed magnetic conducting ring mounted on the drum, a second toothed magnetic ring mounted on the collar and having its teeth mating with the teeth on the first-named ring, a plurality of stationary U-shaped magnetic core members whose legs straddle the rings which therefore rotate through them located at spaced circumferential points, said rings and core members forming a plurality of magnetic paths, a toroidal coil mounted around the shaft and fitting between the projecting legs of the core members whereby any relative motion between the rings and teeth due to shaft load will vary the reluctance of the magnetic path between the legs of each core which will change the inductance of the coil to give an indication.

10. In measuring means associated with a rotating shaft, an axially extending drum secured to the shaft at one end, a collar secured to the shaft adjacent the free end of the drum, a toothed magnetic conducting ring mounted on the drum, a second toothed magnetic ring mounted on the collar and having its teeth mating with the teeth on the first named ring, a plurality of stationary U-shaped magnetic core members whose legs straddle the rings which therefore rotate through them located at spaced circumferential points, said rings and core members forming a plurality of magnetic paths, a toroidal coil mounted around the shaft and fitting between the projecting legs of the core members whereby any relative motion between the rings and teeth due to shaft load will vary the reluctance of the magnetic path between the legs of each core which will change the inductance of the coil to give an indication, and a bridge circuit connected to the coil and an indicating meter connected across the bridge circuit to read the variation and therefore the torque.

11. In measuring means associated with a rotating shaft, a pair of members formed of magnetic material having projecting interjacent portions fixedly supported on the shaft at axially spaced points, stationary solenoid means having core means extending on opposite sides of the pair of members so that the latter may move therethrough upon shaft rotation and any relative movement between the pair of members due to torque in the shaft will change the magnetic inductance of the solenoid but pure rotation of the shaft and members will not.

12. In measuring means associated with a rotating shaft, a pair of members formed of magnetic material having projecting interjacent portions fixedly supported on the shaft at axially spaced points, stationary solenoid means having core means extending on opposite sides of the pair of members so that the latter may move therethrough upon shaft rotation and any relative movement between the pair of members due to torque in the shaft will change the magnetic inductance of the solenoid but pure rotation of the shaft and members will not, and balanced bridge indicating means including the solenoid means in one arm for indicating said inductance changes.

EDWARD J. MARTIN.
WALTER E. SARGEANT.

REFERENCES CITED

The following references are of record in the file of this patent:

UNITED STATES PATENTS

| Number | Name | Date |
|---|---|---|
| 1,685,964 | Smith et al. | Oct. 2, 1928 |
| 1,928,457 | Mershon et al. | Sept. 26, 1933 |
| 2,124,577 | Knerr | July 26, 1938 |
| 2,150,377 | Keinath | Mar. 14, 1939 |
| 2,173,039 | Muir | Sept. 12, 1939 |
| 2,180,176 | Stone | Nov. 14, 1939 |
| 2,208,910 | Pampel et al. | July 23, 1940 |
| 2,256,406 | Muir | Sept. 16, 1941 |
| 2,270,760 | Mershon | Jan. 20, 1942 |
| 2,276,816 | Bagno | Mar. 17, 1942 |
| 2,329,121 | Lamberger et al. | Sept. 7, 1943 |
| 2,349,653 | Godsey | May 23, 1944 |
| 2,354,129 | Langer | July 18, 1944 |
| 2,354,130 | Langer et al. | July 18, 1944 |

FOREIGN PATENTS

| Number | Country | Date |
|---|---|---|
| 236,383 | Great Britain | July 9, 1925 |
| 442,441 | Great Britain | Feb. 3, 1936 |
| 527,835 | France | Aug. 3, 1921 |
| 659,658 | France | Feb. 5, 1929 |

OTHER REFERENCES

"Mechanical Engineering," Sept. 1937, pp. 653–658.